US009254607B2

(12) United States Patent
Yoshida et al.

(10) Patent No.: US 9,254,607 B2
(45) Date of Patent: Feb. 9, 2016

(54) MOISTURE-PERMEABLE AND WATERPROOF FILM, AND METHOD FOR PRODUCING IT

(75) Inventors: Masaki Yoshida, Kanonji (JP); Satoshi Mizutani, Kanonji (JP); Takayoshi Konishi, Kanonji (JP); Hiroko Nozumi, Kanonji (JP)

(73) Assignee: UNICHARM CORPORATION, Ehime (JP)

( * ) Notice: Subject to any disclaimer, the term of this patent is extended or adjusted under 35 U.S.C. 154(b) by 391 days.

(21) Appl. No.: 13/583,065

(22) PCT Filed: Feb. 18, 2011

(86) PCT No.: PCT/JP2011/054209
§ 371 (c)(1),
(2), (4) Date: Sep. 6, 2012

(87) PCT Pub. No.: WO2011/122183
PCT Pub. Date: Oct. 6, 2011

(65) Prior Publication Data
US 2012/0328838 A1    Dec. 27, 2012

(30) Foreign Application Priority Data

Mar. 30, 2010  (JP) ................................ 2010-078980

(51) Int. Cl.
*B29C 53/22*  (2006.01)
*B29C 55/12*  (2006.01)
(Continued)

(52) U.S. Cl.
CPC . *B29C 55/18* (2013.01); *C08J 5/18* (2013.01); *B29K 2067/046* (2013.01); *B29K 2105/16* (2013.01); *B29K 2995/006* (2013.01); *B29K 2995/0065* (2013.01); *B29K 2995/0069* (2013.01); *C08J 2367/04* (2013.01); (Continued)

(58) Field of Classification Search
None
See application file for complete search history.

(56) References Cited

U.S. PATENT DOCUMENTS

| 4,116,892 A | 9/1978 | Schwarz |
| 6,383,431 B1 | 5/2002 | Dobrin et al. |
| 2007/0088302 A1 | 4/2007 | Sugiyama et al. |

FOREIGN PATENT DOCUMENTS

| EP | 0510998 A2 | 10/1992 |
| EP | 1939240 A1 | 7/2008 |

(Continued)

OTHER PUBLICATIONS

Matbase for PLA: http://www.matbase.com/material-categories/natural-and-synthetic-polymers/agro-based-polymers/material-properties-of-polylactic-acid-monomere-pla-m.html#properties. Copyright 2004-2014.*

(Continued)

*Primary Examiner* — David Sample
*Assistant Examiner* — Nicole T Gugliotta
(74) *Attorney, Agent, or Firm* — Hauptman Ham, LLP

(57) ABSTRACT

It is an object of the invention to provide a moisture-permeable and waterproof film that is biodegradable, has high biomass and exhibits high flexibility. The moisture-permeable and waterproof film comprises polylactic acid and an inorganic filler, wherein the film has high-stretch regions (H1) and low-stretch regions (L1) each parallel to a first direction and alternating in the direction perpendicular to the first direction, the film has bending resistance in the range of 15-30 mm, and the film has moisture permeability in the range of 2,000-4,000 g/m²/24 hours.

6 Claims, 9 Drawing Sheets

(51) Int. Cl.
  *B29C 55/26* (2006.01)
  *B29C 55/18* (2006.01)
  *C08J 5/18* (2006.01)
  *B29K 67/00* (2006.01)
  *B29K 105/16* (2006.01)
  *C08K 3/26* (2006.01)
(52) U.S. Cl.
  CPC ..... *C08K2003/265* (2013.01); *C08K 2201/005* (2013.01); *Y10T 428/24479* (2015.01)

(56) References Cited

FOREIGN PATENT DOCUMENTS

| | | | | |
|---|---|---|---|---|
| JP | 63-182135 | A | 7/1988 | |
| JP | 05-247245 | * | 9/1993 | ................ C08J 9/00 |
| JP | 7-008520 | A | 1/1995 | |
| JP | 9-003227 | A | 7/1997 | |
| JP | 2001-293033 | A | 10/2001 | |
| JP | 2002-180361 | A | 6/2002 | |
| JP | 2004-331944 | A | 11/2004 | |
| JP | 2007-105302 | A | 4/2007 | |
| JP | 2009-143111 | A | 7/2009 | |
| JP | 2010-005270 | A | 1/2010 | |
| WO | 98/51475 | A1 | 11/1998 | |
| WO | 00/78627 | A2 | 12/2000 | |
| WO | 02062559 | A1 | 8/2002 | |
| WO | WO02/062559 | * | 8/2002 | .............. A61F 13/15 |
| WO | WO 02/062559 | * | 8/2002 | .............. B29C 55/08 |
| WO | 2011122183 | A1 | 10/2011 | |

OTHER PUBLICATIONS

International Search Report corresponding to PCT/JP2011/054209, dated Mar. 29, 2011.

* cited by examiner

MOISTURE-PERMEABLE AND WATERPROOF FILM, AND METHOD FOR PRODUCING IT

RELATED APPLICATIONS

The present application is based on International Application No. PCT/JP2011/054209, filed Feb. 18, 2011, and claims priority from, Japanese Application Number 2010-078980, filed Mar. 30, 2010.

TECHNICAL FIELD

The present invention relates to a moisture-permeable and waterproof film and to a method for producing it. It is a particular object of the invention to provide a moisture-permeable and waterproof film that is biodegradable, has high biomass and exhibits high flexibility, as well as a method for producing it.

BACKGROUND ART

Films formed from thermoplastic polymers, such as polyolefins, polyesters or polyamides are known as films intended for medicine, hygienic materials, common household materials and industrial materials, and especially moisture-permeable and waterproof films.

For example, PTL 1 discloses a method for producing a moisture-permeable and waterproof film which is a method for producing a porous film in which a resin composition comprising a polyolefin resin and an inorganic filler is formed into a film, and the obtained film is stretched by gear stretching to a factor of 1.2 to 3 in the direction perpendicular to the machine direction, to open pores.

However, the thermoplastic polymers mentioned as olefin resins in PTL 1 are chemically stable in ordinary environments, or in other words they have low biodegradability, and therefore the thermoplastic polymers are problematic in terms of their resistance to decomposition in soil. In addition, since the aforementioned thermoplastic polymers are produced from crude oil-derived materials, i.e. they have low biomass, the thermoplastic polymers release large amounts of carbon dioxide during incineration, and are therefore problematic from the viewpoint of environmental protection.

In addition, in the method for producing a porous film disclosed in PTL 1, the film before gear stretching must have a uniform film thickness and excellent flatness, as well as no reduction in strength or ductility in the cross direction perpendicular to the machine direction, while gear stretching is only possible in the cross direction perpendicular to the machine direction. The method described in PTL 1 allows uniaxial stretching in the machine direction.

Therefore, gear stretching of the porous film of PTL 1 does not produce flexibility in the machine direction, even though it produces flexibility in the cross direction that is perpendicular to the machine direction. In addition, since uniaxial stretching of the porous film of PTL 1 in the machine direction produces stiffness in the machine direction, this causes a problem in that the properties in the machine direction differ significantly from the properties in the cross direction which is perpendicular to the machine direction.

Biodegradable moisture-permeable and waterproof films are also known, such as the uniaxially stretched porous film comprising polylactic acid and a fine powdered filler, disclosed in PTL 2. However, polylactic acid is generally harder than polyolefin resins, while also having higher elasticity and lower breaking elongation, and therefore flexibility cannot easily be imparted to its films by uniaxial stretching. The porous film disclosed in PTL 2 therefore has much room for improvement in terms of flexibility.

CITATION LIST

Patent Literature

PTL 1 WO02/062559
PTL 2 Japanese Unexamined Patent Publication No. 7-8520

SUMMARY OF INVENTION

Technical Problem

Despite these problems associated with conventional moisture-permeable and waterproof films, it is believed that flexibility can be imparted to polylactic acid by providing polylactic acid films and inorganic filler-containing films with local high-stretch regions that have extremely small thicknesses and low-stretch regions in which the original thickness is essentially maintained.

It is therefore an object of the invention to provide a moisture-permeable and waterproof film that is biodegradable, has high biomass and exhibits high flexibility.

Solution to Problem

As a result of diligent research directed toward solving the problems described above, the present inventors have found a moisture-permeable and waterproof film comprising polylactic acid and an inorganic filler, wherein the film has high-stretch regions (H1) and low-stretch regions (L1) each parallel to a first direction and alternating in the direction perpendicular to the first direction, the film has bending resistance in the range of 15-30 mm, and the film has moisture permeability in the range of 2,000-4,000 $g/m^2/24$ hours.

Specifically, the present invention relates to J1 to J12.

[J1]

A moisture-permeable and waterproof film comprising polylactic acid and an inorganic filler, wherein the film has high-stretch regions (H1) and low-stretch regions (L1) each parallel to a first direction and alternating in the direction perpendicular to the first direction, the film has bending resistance in the range of 15-30 mm, and the film has moisture permeability in the range of 2,000-4,000 $g/m^2/24$ hours.

[J2]

The film according to J1, further having high-stretch regions (H2) and low-stretch regions (L2) each parallel to a second direction and alternating in the direction perpendicular to the second direction.

[J3]

The film according to J2, wherein the first direction is the machine direction or the cross direction perpendicular to the machine direction, and the second direction is the machine direction or the cross direction perpendicular to the machine direction.

[J4]

The film according to any one of J1 to J3, wherein the polylactic acid has a melting point of 150° C. to 170° C.

[J5]

The film according to any one of J1 to J4, wherein the inorganic filler is selected from the group consisting of calcium carbonate, barium carbonate, calcium sulfate, barium sulfate, magnesium hydroxide, aluminum hydroxide, calcium hydroxide, magnesium oxide, titanium oxide, zinc oxide, silicon oxide and talc.

[J6]

The film according to any one of J1 to J5, wherein the inorganic filler has a mean particle size of 1 to 10 μm.

[J7]

The film according to any one of J1 to J6, wherein the polylactic acid:inorganic filler mass ratio is 50:50 to 90:10.

[J8]

A method of producing the film according to any one of modes 1 to 7, comprising the steps of:

providing a film comprising polylactic acid and an inorganic filler, and stretching the film comprising polylactic acid and an inorganic filler by passing it through the gap between a pair of gear rolls (G1) having rotational axis lines perpendicular to the machine direction and rotating while a plurality of teeth arranged around the peripheral surface of each of the pair of gear rolls (G1) are mutually engaged, to form a film having high-stretch regions (H1) and low-stretch regions (L1).

[J9]

The method according to J8, after the step of stretching to form a film with high-stretch regions (H1) and low-stretch regions (L1), further comprising a step of stretching the film comprising the high-stretch regions (H1) and low-stretch regions (L1) by passing it through the gap between a pair of gear rolls (G2) having rotational axis lines perpendicular to the machine direction and rotating while a plurality of teeth arranged around the peripheral surface of each of the pair of gear rolls (G2) are mutually engaged, to form a film additionally having high-stretch regions (H2) and low-stretch regions (L2).

[J10]

The method according to J8 or J9, after the step of providing the film comprising polylactic acid and an inorganic filler, further comprising a step of preheating the film comprising the polylactic acid and inorganic filler at a temperature of 40° C. or higher and below the glass transition temperature of the polylactic acid.

[J11]

The method according to any one of J8 to J10, wherein at least some of the plurality of teeth of the pair of gear rolls (G1) and/or at least some of the plurality of teeth of the pair of gear rolls (G2) have protrusions and/or depressions.

[J12]

The method according to any one of J8 to J11, wherein the draw ratio is in the range of 1.30 to 1.80 in the step of stretching to form a film with high-stretch regions (H1) and low-stretch regions (L1) and/or the step of stretching to form a film additionally having high-stretch regions (H2) and low-stretch regions (L2).

Advantageous Effects of Invention

The moisture-permeable and waterproof film of the invention is biodegradable, has high biomass and exhibits high flexibility.

DESCRIPTION OF EMBODIMENTS

Figure 1:
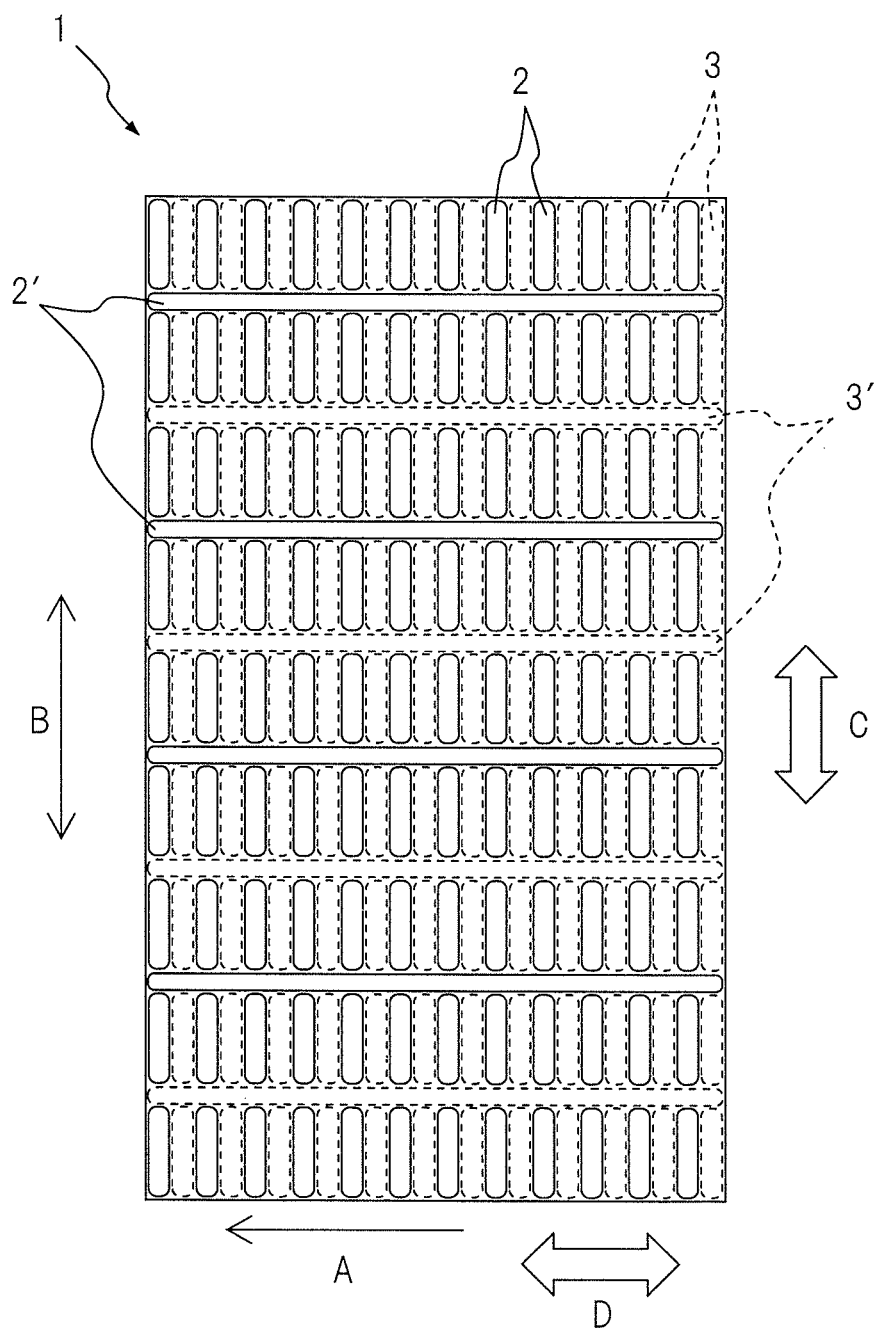
FIG. 1 is a schematic diagram showing one embodiment of the moisture-permeable and waterproof film of the invention.

The moisture-permeable and waterproof film of the invention, and a method for producing it, will now be explained in detail.

The moisture-permeable and waterproof film of the invention comprises polylactic acid and an inorganic filler.

Polylactic acid is a biodegradable polymer that can be produced from plant sources, such as corn, and the amount of carbon dioxide generated from production to incineration is extremely low at about 0.3 kg/kg-polymer, compared to about 4.0 kg/kg-polymer for crude oil-derived polyethylene and about 6.1 kg/kg-polymer for crude oil-derived polyesters. These numerical values for polylactic acid are based on data published by NatureWorks (PLA6(2006/2007)), the numerical values for polyethylene are based on data published by the National Institute of Advanced Industrial Science and Technology, and the numerical values for polyesters are based on data published by Plastic Europe.

The melting point of polylactic acid can be modified by adjusting the ratio of the D-form and L-form optical isomers of the lactic acid starting material.

For example, by conducting copolymerization with a D-form:L-form molar ratio of about 50:50, it is possible to produce polylactic acid with a melting point of approximately 190° C. to 220° C. Similarly, polylactic acid with a melting point of approximately 170° C. is produced by copolymerization of a mixture with an L-form:D-form molar ratio of about 99:1, polylactic acid with a melting point of approximately 150° C. is produced by copolymerization of a mixture with an L-form:D-form molar ratio of about 97:3, polylactic acid with a melting point of approximately 130° C. is produced by copolymerization of a mixture with an L-form:D-form molar ratio of about 92:8, and polylactic acid with a melting point of approximately 110° C. is produced by copolymerization of a mixture with an L-form:D-form molar ratio of about 88:12.

By adjusting the D-form:L-form molar ratio to between about 99:1 and about 97:3, for example, it is possible to produce polylactic acid with a melting point of between about 150° C. and 170° C.

If the molar ratio of the D-form is about 18 mol % or greater, the polylactic acid will not have a distinct melting point and an amorphous polymer with a softening temperature of lower than about 90° C. will be obtained. For such an amorphous polylactic acid, the visually confirmed softening temperature is treated as the melting point for convenience.

The melting point can be measured using a differential scanning calorimeter. The melting point may be measured using a Model DSC-60 DSC measuring apparatus by Shimadzu Corp., for example, with temperature increase of 10° C./min.

The polylactic acid preferably has a melting point of between about 140° C. and 180° C., and more preferably a melting point of between about 150° C. and 170° C. A melting point of below about 140° C. will tend to result in reduced stiffness of the film itself, wrinkles and damage during film formation and slit cutting, wrinkles during gear stretching, and wrinkles during insertion into diapers, while a melting point of higher than about 180° C. will tend to result in increased stiffness of the film itself, preventing adequate stretching.

The polylactic acid preferably has a weight-average molecular weight of about 60,000 or greater, and more preferably a weight-average molecular weight of between about 100,000 and about 300,000. If the weight-average molecular weight is lower than about 60,000 the sheet strength will tend to be reduced, and if the weight-average molecular weight is higher than about 300,000, more time will tend to be necessary for biodegradation of the polylactic acid.

The polylactic acid has a biomass percentage in the range of about 90% to about 100%, and preferably about 100%.

As used herein, "biomass percentage" refers to the percentage of organic sources with respect to the total mass of petroleum-produced fossil fuel sources and renewable bio-derived organic sources.

The inorganic filler to be used for the invention is a component added to serve as origins for forming pores in the film during stretching. The inorganic filler is also a component that serves to impart flexibility to the moisture-permeable and waterproof film of the invention.

The composition of the inorganic filler is not particularly restricted, and examples include calcium carbonate, barium carbonate, calcium sulfate, barium sulfate, magnesium hydroxide, aluminum hydroxide, calcium hydroxide, magnesium oxide, titanium oxide, zinc oxide, silicon oxide and talc. Calcium carbonate and titanium oxide are preferred as inorganic fillers.

The inorganic filler preferably has a mean particle size of about 1 to about 10 μm, and more preferably it has a mean particle size of about 3 to about 7 μm. If the mean particle size is smaller than about 1 μm, the moisture permeable and flexibility of the moisture-permeable and waterproof film of the invention may be insufficient, and if the mean particle size is larger than about 10 μm, the moisture permeability of the moisture-permeable and waterproof film of the invention may be too high, potentially producing dampness in the clothing.

As used herein, "mean particle size" refers to the value obtained by arbitrarily selecting 100 primary particles of the inorganic filler by electron microscope observation, measuring the long diameters, and calculating their arithmetic mean.

The polylactic acid:inorganic filler mass ratio of the moisture-permeable and waterproof film of the invention is preferably about 50:50 to about 90:10, and more preferably about 60:40 to about 70:30. If the polylactic acid mass ratio is lower than about 50%, the strength of the film may be insufficient, while if the polylactic acid mass ratio is higher than about 90%, the number of pores in the film may be insufficient and the moisture permeability may be too low.

The moisture-permeable and waterproof film of the invention preferably has bending resistance in the range of about 15 to about 30 mm and more preferably in the range of about 15 to about 20 mm, as an index of flexibility. If the bending resistance is lower than about 15 mm, the stiffness will be reduced and wrinkles will tend to form during take-up of the film, slit cutting to the desired width and working into a back sheet for a diaper or the like, while if the bending resistance is higher than about 30 mm, the stiffness will be increased and the user will tend to be more cognizant of discomfort when the film is used on the body, such as in an absorbent article.

As used herein, "bending resistance" is the value measured according to JIS L 1096: Method 1999 8.19.1 A (45° cantilever method), with a 25 mm width×150 mm length sample.

The moisture-permeable and waterproof film of the invention has moisture permeability in the range of about 2,000 to about 4,000 $g/m^2/24$ hours, and preferably moisture permeability in the range of about 2,500 to about 3,500 $g/m^2/24$ hours. If the moisture permeability is lower than about 2,000 $g/m^2/24$ hours, humidity will tend to be trapped when the film is used on the body, tending to make the user more cognizant of unpleasantness, while if the moisture permeability is higher than about 4,000 $g/m^2/24$ hours, the moisture permeability will be too high, potentially producing dampness in the clothing.

As used herein, "moisture permeability" is the value measured according to JIS Z 0208:1976, "Moisture permeability test method for moisture-proof packaging materials" (cup method). The moisture permeation (emission) per unit area ($m^2$) is measured after filling a moisture-permeable cup with 20 g of water instead of calcium chloride, and allowing it to naturally stand for 24 hours under environmental conditions with a temperature of 40° C. and a relative humidity of 60%.

The moisture-permeable and waterproof film of the invention has a water pressure resistance in the range of about 800 to about 2,000 mm and preferably a water pressure resistance in the range of 900 to about 1,500 mm. If the water pressure resistance is lower than about 800 mm, body fluids, such as urine may leak when the film is subjected to body pressure, such as when it is used as a back film for diapers, and if the water pressure resistance is greater than about 2,000 mm, the moisture permeability will tend to be poor.

As used herein, "water pressure resistance" is the value measured according to JIS L 1092:2009, "Method A" (Low hydraulic pressure test).

Because high-stretch regions and low-stretch regions are present in the moisture-permeable and waterproof film of the invention, the thickness of the film may vary depending on the location. The basis weight is therefore used instead of the film thickness.

The basis weight of the moisture-permeable and waterproof film of the invention is not particularly restricted so long as it is in a range in which the effect of the invention is exhibited, and it is preferably in the range of about 15 to about 30 $g/m^2$, and more preferably in the range of about 17 to about 25 $g/m^2$.

A basis weight of greater than about 30 $g/m^2$ will tend to result in reduced moisture permeability and/or increased bending resistance. A basis weight of less than about 15 $g/m^2$ will tend to lower the strength of the moisture-permeable and waterproof film and lead to tearing.

The moisture-permeable and waterproof film of the invention has high-stretch regions (H1) and low-stretch regions (L1) each parallel to a first direction and alternating in the direction perpendicular to the first direction.

There are no particular restrictions on the first direction, but for production efficiency it may be the machine direction during production, or the cross direction which is perpendicular to the machine direction (hereunder referred to simply as the "cross direction").

The moisture-permeable and waterproof film of the invention may also have high-stretch regions (H2) and low-stretch regions (L2) each parallel to a second direction and alternating in the direction perpendicular to the second direction. In this case, the first direction and the second direction may be the same direction or different directions.

When it is preferred to minimize the difference in the physical properties in the machine direction and cross direction of the moisture-permeable and waterproof film of the invention, the first direction and second direction preferably have a larger angle of intersection between the 2 directions, preferably close to 90°.

There are no particular restrictions on the first direction and second direction in such cases, but for production efficiency they may be, respectively, the machine direction and cross direction, or the cross direction and machine direction.

When it is preferred to have high flexibility in a particular direction of the moisture-permeable and waterproof film of the invention, the first direction and second direction preferably have a smaller angle of intersection between the 2 directions, preferably close to 0°, and more preferably 0°.

As used herein, the "high-stretch regions" are regions of low thickness, that can impart high moisture permeability and flexibility to the moisture-permeable and waterproof film of the invention.

As used herein, the "low-stretch regions" are regions that can impart minimal stiffness to the moisture-permeable and waterproof film of the invention.

Figure 3:
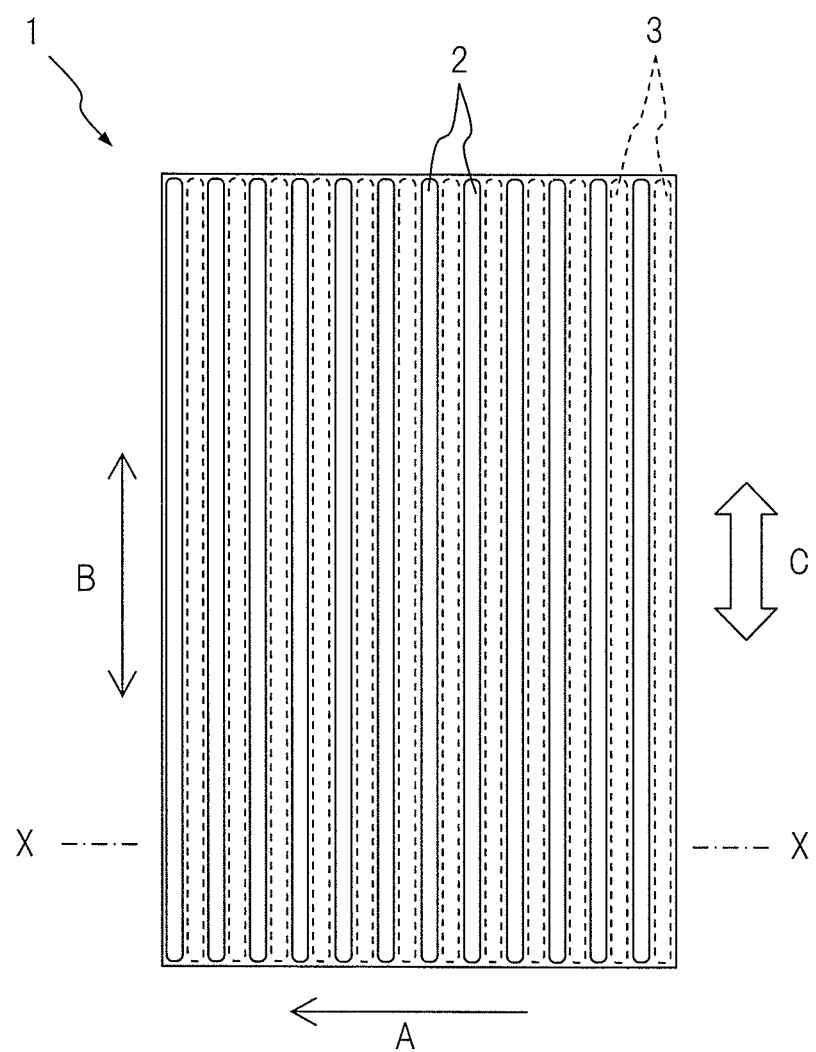
FIG. 3 is a schematic diagram showing an embodiment of the moisture-permeable and waterproof film of the invention.

FIG. 3 is a schematic diagram showing an embodiment of the moisture-permeable and waterproof film of the invention. In FIG. 3, A represents the machine direction during production, and B represents the cross direction. The moisture-permeable and waterproof film 1 shown in FIG. 3 has projections 2 and recesses 3 each parallel to the cross direction B, and alternating in the machine direction A. The projections 2 and recesses 3 arise due to the high-stretch regions (H1) and low-stretch regions (L1) of the moisture-permeable and waterproof film 1. The first direction C in FIG. 3 corresponds to the cross direction B.

FIG. 1 is a schematic diagram showing another embodiment of the moisture-permeable and waterproof film of the invention. In FIG. 1 as well, A represents the machine direction during production, and B represents the cross direction. The moisture-permeable and waterproof film 1 shown in FIG. 1 has projections 2 and recesses 3 parallel to the cross direction B, and projections 2' and recesses 3' parallel to the machine direction. The projections 2 and 2' and recesses 3 and 3' arise due to the high-stretch regions (H1) and low-stretch regions (L1), and the high-stretch regions (H2) and low-stretch regions (L2) of the moisture-permeable and waterproof film 1. In FIG. 1, the first direction C corresponds to the cross direction B, and the second direction D corresponds to the machine direction A.

This will now be explained in the context of the production steps.

The method for producing a moisture-permeable and waterproof film according to the invention comprises a step of providing a film comprising polylactic acid and an inorganic filler.

This step can be accomplished by mixing the polylactic acid and inorganic filler in a prescribed ratio and forming a film.

The thickness of the film comprising the polylactic acid and inorganic filler will differ depending on the purpose of use of the moisture-permeable and waterproof film that is to be produced, but preferably it is about 10 to about 30 μm and more preferably about 15 to about 25 μm.

The film comprising the polylactic acid and inorganic filler may be one purchased as a commercially available product.

The method for producing a moisture-permeable and waterproof film according to the invention comprises a step of stretching the film comprising polylactic acid and an inorganic filler by passing it through the gap between a pair of gear rolls (G1) having rotational axis lines perpendicular to the machine direction and rotating while a plurality of teeth arranged around the peripheral surface of each of the pair of gear rolls (G1) are mutually engaged, for stretching to form a film having high-stretch regions (H1) and low-stretch regions (L1) (this step may hereunder be referred to as the "first stretching step"). The high-stretch regions (H1) and low-stretch regions (L1) are each parallel to a first direction and arranged alternating in the direction perpendicular to the first direction.

Figure 2:
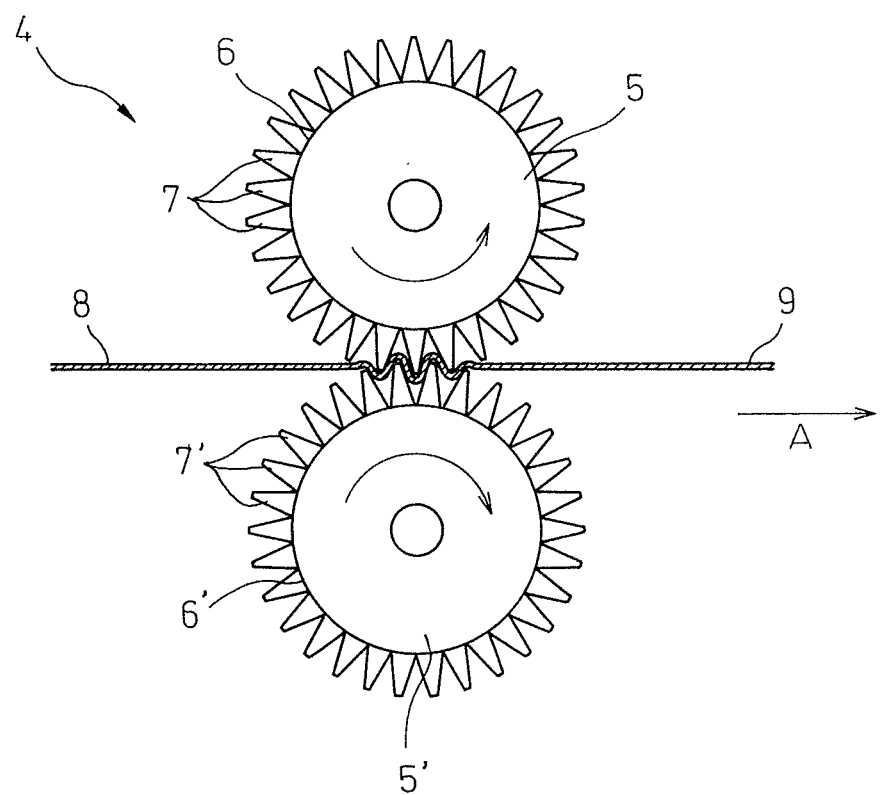
FIG. 2 is a schematic diagram showing an example of a gear stretcher.

A gear stretcher as shown in FIG. 2, for example, may be used to carry out the first stretching step. The gear stretcher 4 shown in FIG. 2 has a pair of gear rolls 5 and 5'. A plurality of teeth 7 and 7' are arranged around the peripheral surfaces 6 and 6' of the gear rolls 5 and 5'. In the gear stretcher 4 shown in FIG. 2, the rotational axis lines of the gear rolls 5 and 5' are both perpendicular to the machine direction A of the film. The plurality of teeth 7 and 7' are arranged on the peripheral surfaces 6 and 6' in a manner parallel to the rotational axis lines.

Figure 4:
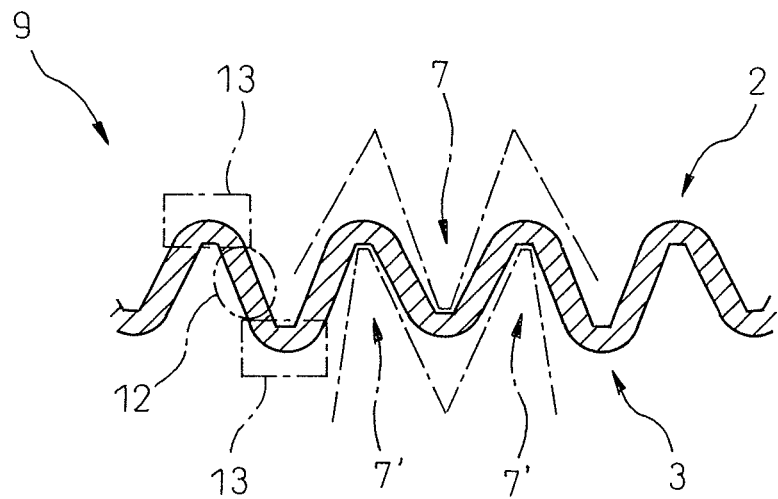
FIG. 4 is a schematic diagram showing a cross-section along X-X of FIG. 3, together with the positions of the gear teeth during gear stretching.

In the gear stretcher 4 of FIG. 2, a film 8 comprising polylactic acid and an inorganic filler is passed through the gap between a pair of gear rolls 5 and 5', and a plurality of teeth 7 and 7' on the gear rolls 5 and 5' that mutually engage as it passes through the gear rolls 5 and 5' stretch the film 8 comprising the polylactic acid and inorganic filler based on the three-point bending principle, forming a film 9 with high-stretch regions (H1) and low-stretch regions (L1), as a moisture-permeable and waterproof film of the invention (see FIG. 4).

In the gear stretcher 4 of FIG. 2, the film 8 is stretched in the machine direction A.

Throughout the present specification, stretching using a gear stretcher will also sometimes be referred to simply as "gear stretching".

In the gear stretcher 4 of FIG. 2, the first direction corresponds to the cross direction, and therefore the film 9 with high-stretch regions (H1) and low-stretch regions (L1) has the high-stretch regions (H1) and low-stretch regions (L1), each parallel to the cross direction, alternating in the machine direction.

FIG. 3 is a schematic diagram of one embodiment of the film 9 with high-stretch regions (H1) and low-stretch regions (L1) produced by the gear stretcher 4 shown in FIG. 2, i.e. the moisture-permeable and waterproof film of the invention.

The moisture-permeable and waterproof film 1 shown in FIG. 3 has projections 2 and recesses 3 each parallel to the cross direction B, and alternating in the machine direction A.

FIG. 4 is a schematic diagram showing a cross-section along X-X of FIG. 3, together with the positions of the gear teeth during gear stretching. The projections 2 arise due to the teeth 7' of the lower gear roll during the first stretching step, while the recesses 3 arise due to the teeth 7 of the upper gear roll during the first stretching step. During the first stretching step, the film is anchored in the regions where the film contacts the tip sections of the teeth 7 and 7', which undergo absolutely or essentially no stretching, resulting in formation of low-stretch regions 13 as the low-stretch regions (L1). Meanwhile during the first stretching step, the film is stretched in the regions where the film does not contact the tip sections of the teeth 7 and 7', thus resulting in formation of high-stretch regions 12 as the high-stretch regions (H1).

Since high-stretch regions (H1) and low-stretch regions (L1) are formed in the film comprising polylactic acid and an inorganic filler, the resulting film has projections 2 and recesses 3 as shown in FIG. 3.

In FIG. 3, the high-stretch regions (H1) (not shown) are formed centering on the border sections of the projections 2 and recesses 3 and along the projections 2 and recesses 3, or in other words, along the first direction C, while the low-stretch regions (L1) (not shown) are formed centering on the sections other than the edges of the projections 2 and the sections other than the edges of the recesses 3, and along the projections 2 and recesses 3, or in other words, along the first direction C. The moisture-permeable and waterproof film 1 shown in FIG. 3 has high-stretch regions (H1) and low-stretch regions (L1) alternating in the direction perpendicular to the first direction C.

As used herein, a "high-stretch region" means a physically stretched region, or in other words, a region among the stretched regions wherein the degree of stretching is greater than in the low-stretch regions.

Also as used herein, a "low-stretch region" means a section wherein the degree of physical stretching is lower than in the high-stretch regions. The low-stretch regions include sections that are not physically stretched, i.e. unstretched sections.

The method of the invention may further comprise a step of stretching the film comprising the high-stretch regions (H1) and low-stretch regions (L1) by passing it through the gap between a pair of gear rolls (G2) having rotational axis lines perpendicular to the machine direction and rotating while a plurality of teeth arranged around the peripheral surface of each of the pair of gear rolls (G2) are mutually engaged, for stretching to form a film additionally having high-stretch regions (H2) and low-stretch regions (L2) (this step may hereunder be referred to as the "second stretching step"). The high-stretch regions (H2) and low-stretch regions (L2) are each parallel to a second direction and arranged alternating in the direction perpendicular to the second direction.

Figure 5:
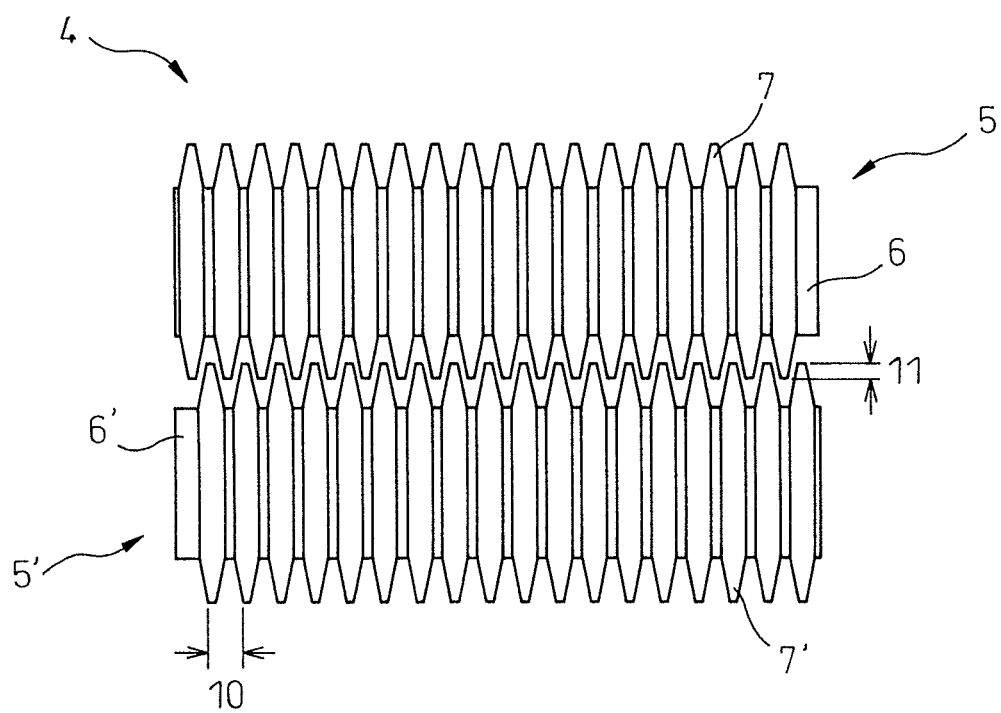
FIG. 5 is a schematic diagram showing another example of a gear stretcher.

A gear stretcher 4 as shown in FIG. 5, for example, may be used to carry out the second stretching step. The gear stretcher 4 shown in FIG. 5 has a pair of gear rolls 5 and 5'. A plurality of teeth 7 and 7' are arranged around the peripheral surfaces 6 and 6' of the gear rolls 5 and 5'. In the gear stretcher 4 shown in FIG. 5, the rotational axis lines of the gear rolls 5 and 5' are both perpendicular to the machine direction A of the film. The plurality of teeth 7 and 7' are arranged on the peripheral surfaces 6 and 6' in a manner perpendicular to the rotational axis lines. Numeral 10 in FIG. 5 denotes the gear pitch, and numeral 11 denotes the gear tooth cutting depth.

By passing the film with high-stretch regions (H1) and low-stretch regions (L1) shown in FIG. 3 through the gear stretcher 4 shown in FIG. 5, it is possible to produce a film having projections 2' and recesses 3' on the projections 2 and recesses 3, as shown in FIG. 1.

Referring to FIG. 4 to explain this phenomenon produced in the second stretching step, the projections 2' arise due to the teeth 7' of the lower gear roll, while the recesses 3' arise due to the teeth 7 of the upper gear roll. Also, during the second stretching step, the film is anchored in the regions where the film contacts the tip sections of the teeth 7 and 7', which undergo absolutely or essentially no stretching, resulting in formation of low-stretch regions 13 as the low-stretch regions (L2). Meanwhile during the second stretching step, the film is stretched in the regions where the film does not contact the tip sections of the teeth 7 and 7', thus resulting in formation of high-stretch regions 12 as the high-stretch regions (H2).

In the gear stretcher 4 of FIG. 5, the film is stretched in the cross direction.

The first stretching step and second stretching step were explained above using the gear stretchers shown in FIG. 2 and FIG. 5, but the construction of the gear stretcher is not particularly restricted so long as it can produce a moisture-permeable and waterproof film of the invention, having high-stretch regions (H1) and low-stretch regions (L1) each parallel to the first direction and alternating in the direction perpendicular to the first direction, and optionally, high-stretch regions (H2) and low-stretch regions (L2) each parallel to the second direction and alternating in the direction perpendicular to the second direction.

For example, according to a different embodiment of the invention, the gear stretcher 4 shown in FIG. 5 may be used to carry out the first stretching step, and optionally, the gear stretcher 4 shown in FIG. 2 may be used to carry out the second stretching step.

Figure 6:
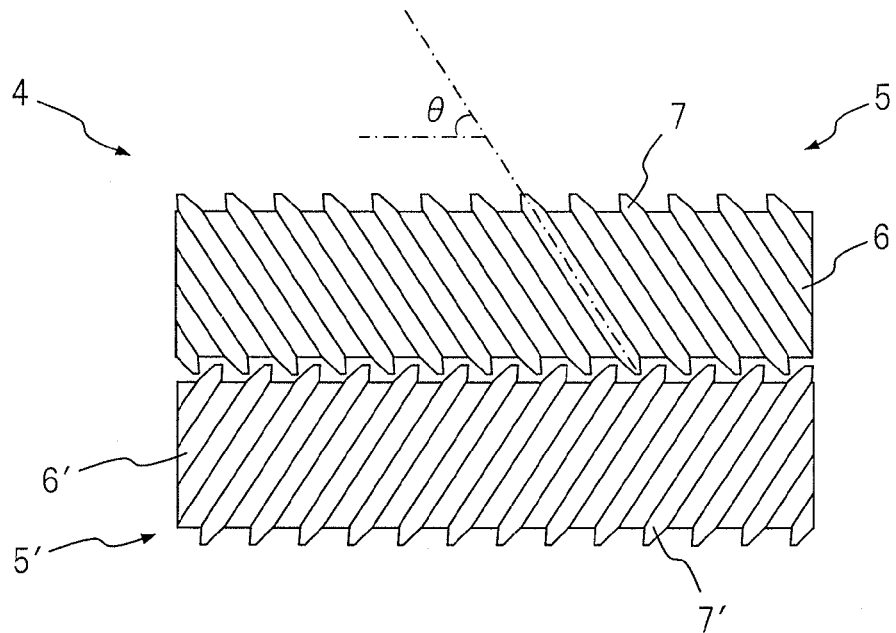
FIG. 6 is a schematic diagram showing yet another example of a gear stretcher.

According to yet a different embodiment of the invention, the gear stretcher 4 shown in FIG. 6 may be used to carry out the first stretching step and/or second stretching step. The gear stretcher 4 shown in FIG. 6 has a pair of gear rolls 5 and 5'. A plurality of teeth 7 and 7' are arranged around the peripheral surfaces 6 and 6' of the gear rolls 5 and 5'. In the gear stretcher 4 shown in FIG. 6, the rotational axis lines of the gear rolls 5 and 5' are both perpendicular to the machine direction A of the film. The plurality of teeth 7 and 7' are arranged around the peripheral surfaces 6 and 6' at a fixed angle of $\theta$ with respect to the rotational axis line.

Figure 7:
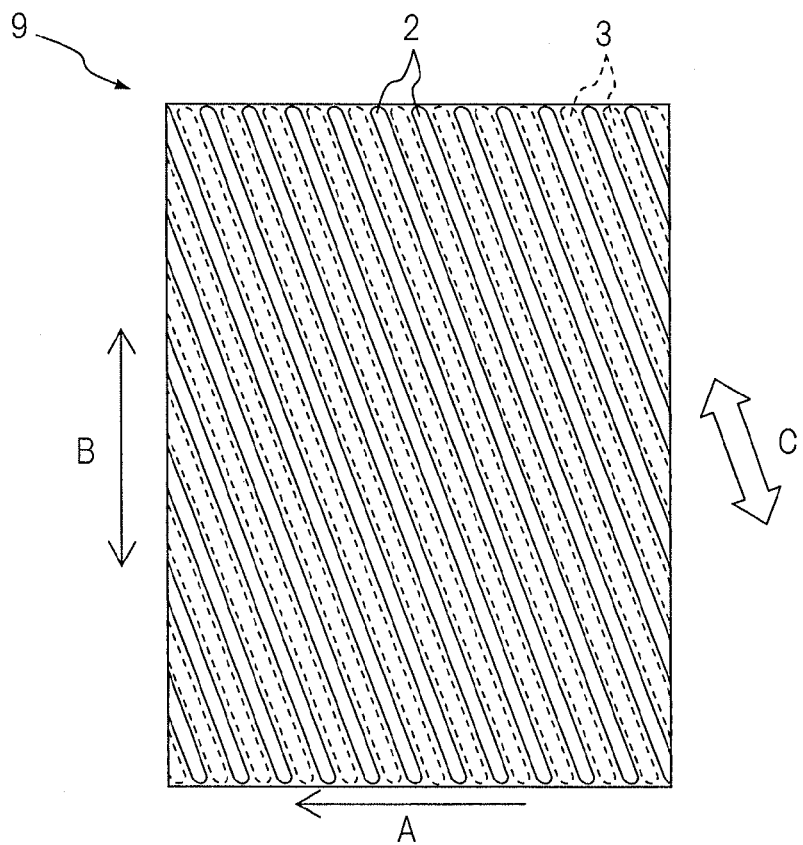
FIG. 7 is a schematic diagram showing another example of a film having high-stretch regions (H1) and low-stretch regions (L1).

By using the gear stretcher 4 shown in FIG. 6 to carry out the first stretching step, it is possible to form a film 9 with high-stretch regions (H1) and low-stretch regions (L1), as a moisture-permeable and waterproof film of the invention having projections 2 and recesses 3, such as shown in FIG. 7.

In the film 9 with high-stretch regions (H1) and low-stretch regions (L1), the high-stretch regions (H1) (not shown) are formed centering on the border sections of the projections 2 and recesses 3 and along the projections 2 and recesses 3, or in other words, along the first direction C, while the low-stretch regions (L1) (not shown) are formed centering on the sections other than the edges of the projections 2 and the sections other than the edges of the recesses 3, and along the projections 2 and recesses 3, or in other words, along the first direction C. The film 9 with high-stretch regions (H1) and low-stretch regions (L1) also has the high-stretch regions (H1) and low-stretch regions (L1) alternating in the direction perpendicular to the first direction C.

Figure 8:
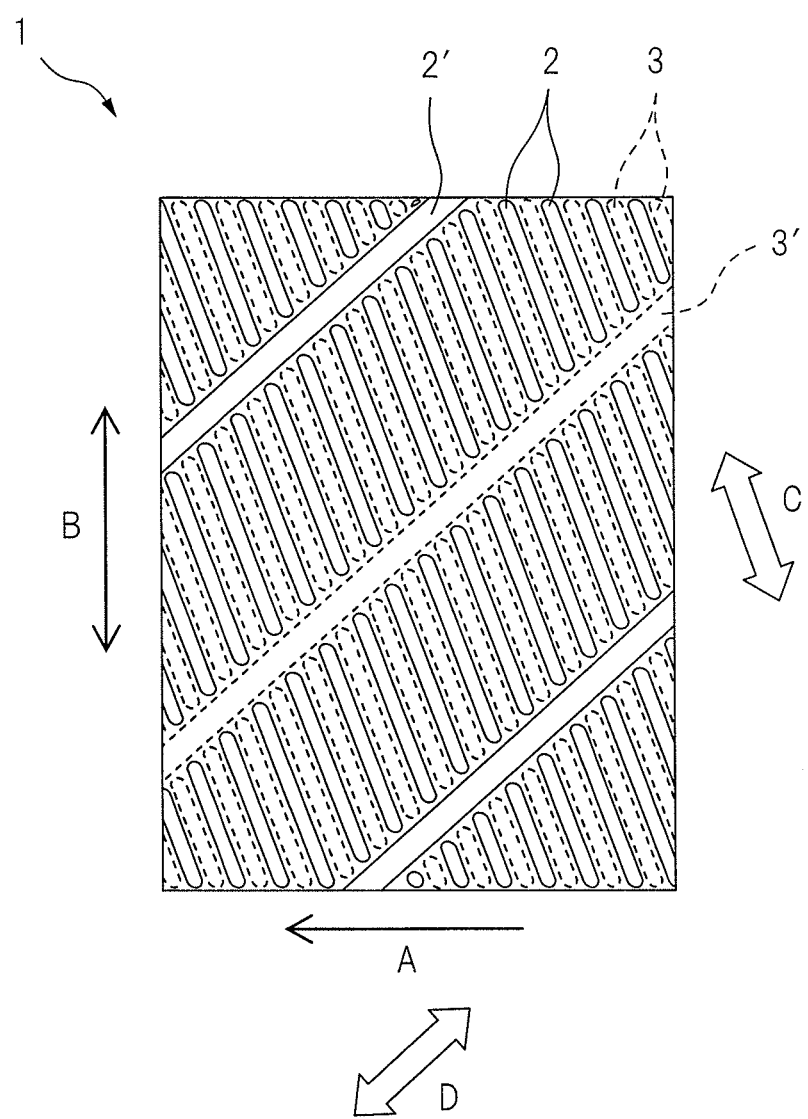
FIG. 8 is a schematic diagram showing another example of the moisture-permeable and waterproof film of the invention.

Optionally, the film 9 with high-stretch regions (H1) and low-stretch regions (L1) may be subjected to a second stretching step to produce a moisture-permeable and waterproof film 1, such as shown in FIG. 8, having projections 2 and recesses 3, and additionally having projections 2' and recesses 3' on the projections 2 and recesses 3. The second stretching step may be carried out using a gear stretcher, such as shown in FIG. 6 wherein the plurality of teeth have a fixed angle $\theta'$ ($\theta' \neq \theta$) with the rotational axis line.

The moisture-permeable and waterproof film 1 shown in FIG. 8 has high-stretch regions (H1) and low-stretch regions (L1) each parallel to a first direction C and alternating in the direction perpendicular to the first direction C, and also high-stretch regions (H2) and low-stretch regions (L2) each parallel to a second direction D and alternating in the direction perpendicular to the second direction D.

In the gear stretcher used for the first stretching step, the gear pitch is preferably about 2 to about 15 mm and more preferably about 3 to about 10 mm. If the gear pitch is smaller than about 2 mm it may not be possible to accomplish sufficient stretching due to the relationship with the cutting depth, while if the gear pitch is larger than about 15 mm, the film may suffer tearing unless sufficient consideration is given to the cutting depth and machining speed.

The gear pitch is the interval between one tooth and another tooth, and it is denoted by numeral 10 in FIG. 5.

In the gear stretcher used for the first stretching step, the gear tooth cutting depth is preferably about 2 to about 10 mm and more preferably about 3 to about 7 mm. If the gear tooth cutting depth is smaller than about 2 mm it may not be possible to accomplish sufficient stretching and the desired flexibility and moisture permeability may not be exhibited, while if the gear tooth cutting depth is larger than about 10 mm, the film may suffer tearing unless sufficient consideration is given to the gear pitch and machining speed.

The gear tooth cutting depth is the depth at any section where an upper gear roll tooth and lower gear roll tooth overlap, and it is denoted by numeral 11 in FIG. 5.

In the first stretching step, the draw ratio is preferably in the range of about 1.30 to about 1.80 and more preferably in the range of about 1.40 to about 1.60. If the draw ratio is lower than about 1.30, the proportion of low-stretch regions may be reduced and the moisture permeability of the produced film may be inadequate, while if the draw ratio is greater than about 1.80, the film may suffer tearing in the second stretching step.

As used herein, "draw ratio" refers to the value calculated by the following formula:

Draw ratio=$BW_0/BW_1$ where $BW_0$ is the basis weight before gear stretching and $BW_1$ is the basis weight after gear stretching.

The basis weight is measured using the following formula:

Basis weight(g/m$^2$)=$A$÷((100/1000)×(100/1000))

based on the mass A (g) of a sample cut to a 100 mm length× 100 mm width square shape.

The mass A is measured up to 4 decimal places.

In the gear stretcher used for the second stretching step, the gear pitch and gear tooth cutting depth may be each the same as the gear pitch and gear tooth cutting depth of the gear stretcher used in the first stretching step.

In the second stretching step, the draw ratio is preferably in the range of about 1.30 to about 1.80 and more preferably in the range of about 1.40 to about 1.60. If the draw ratio is lower than about 1.30, the proportion of low-stretch regions may be reduced and the moisture permeability of the produced film may be inadequate, while if the draw ratio is greater than about 1.80, the film may suffer tearing during stretching.

The reason for employing gear stretching for improved moisture permeability in the method of the invention is as follows.

With axial stretching, such as uniaxial stretching, which is commonly conducted in the technical field for improved moisture permeability, molecular orientation proceeds thereby increasing the strength in the stretching direction, but it also lowers the ductility in the stretching direction, tending to result in greater rigidity of the produced film. With gear stretching, on the other hand, high-stretch regions and low-stretch regions are produced, such that the rigidity of the film as a whole is minimized. For example, in a film having high-stretch regions and low-stretch regions that are each parallel to the machine direction and alternating in the cross direction, flexibility is improved in the cross direction, while in a film having high-stretch regions and low-stretch regions each parallel to the cross direction and alternating in the machine direction, flexibility is improved in the machine direction. Naturally, in a film having high-stretch regions and low-stretch regions that are each parallel to the machine direction and alternating in the cross direction, and also high-stretch regions and low-stretch regions each parallel to the cross direction and alternating in the machine direction, flexibility is improved in both the machine direction and the cross direction.

For the pair of gear rolls (G1) used in the first stretching step and the pair of gear rolls (G2) optionally used in the second stretching step, the plurality of teeth may have fixed tooth heights, or the tooth heights may be variable and protrusions and/or depressions may be present. The protrusions are sections that serve to further increase the stretching degree of the high-stretch regions, while the depressions are sections that serve to lower the stretching degree of the high-stretch regions.

Figure 9:
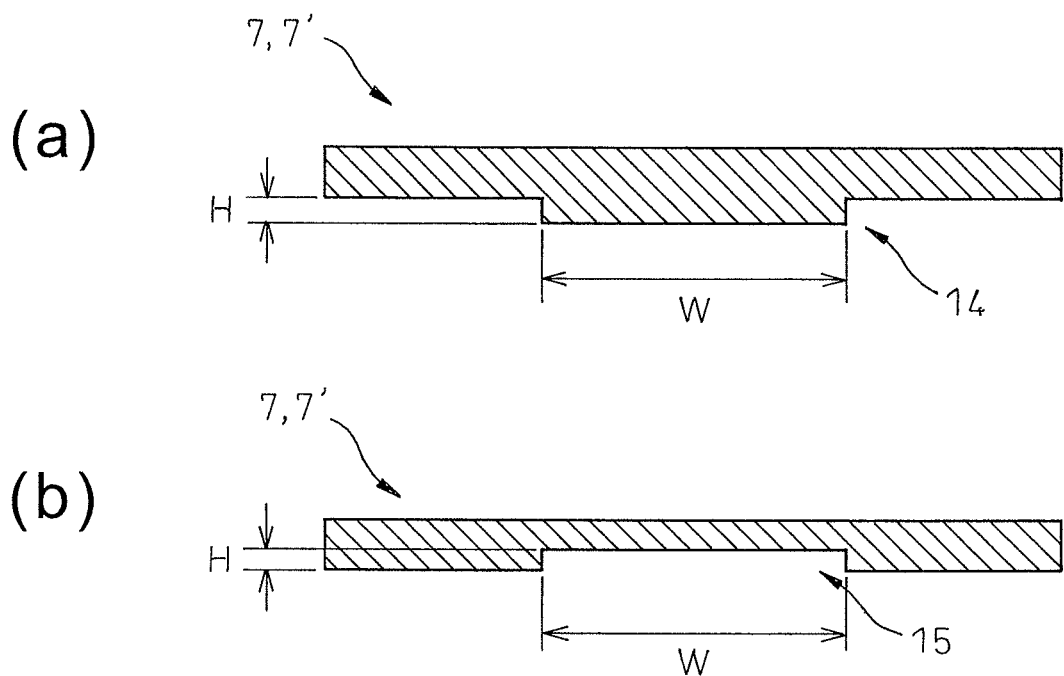
FIG. 9 is a diagram illustrating a protrusion and a depression in a gear roll tooth.

FIGS. 9(a) and (b) are diagrams illustrating a protrusion and a depression in teeth of a gear roll having a plurality of teeth arranged in parallel along the rotational axis lines, as shown in FIG. 2. In FIG. 9, the top sides of the teeth are connected to the peripheral surface of the gear roll, while the bottom sides of the teeth are in contact with the film during stretching.

On the tooth 7,7' shown in FIG. 9(a), a protrusion 14 with height H and width W is formed at the center on the side that contacts with the film. Forming a protrusion in this manner will allow regions with a higher stretching degree than the high-stretch regions (hereunder referred to as "super-high-stretch regions") to be formed in the moisture-permeable and waterproof film of the invention. Since the super-high-stretch regions have a higher stretching degree than the other high-stretch regions, their air permeability and flexibility are superior to the other high-stretch regions, and they can therefore further improve the air permeability and flexibility of the moisture-permeable and waterproof film of the invention, while limiting the super-high-stretch regions will not significantly lower the overall strength.

The protrusions may have variable heights and widths depending on their location on the teeth. For example, if protrusions on the plurality of teeth of the upper roll or lower roll have protrusion widths of $W_m$ for the mth tooth and protrusion widths of $W_n$ for the nth tooth, then they may be in the relationship $W_m < W_{m+1}$, and $W_n > W_{n+1}$ from a given location.

Also, if protrusions on the plurality of teeth of the upper roll or lower roll have protrusion heights of $H_m$ for the mth tooth and protrusion heights of $H_n$ for the nth tooth, then they may be in the relationship $H_m < H_{m+1}$, and $H_n > H_{n+1}$ from a given location.

In the pair of gear rolls, the protrusions on the teeth of the upper gear roll and the protrusions on the teeth of the lower gear roll may be engaged to further increase the stretching effect.

The plurality of teeth may also have the shape shown in FIG. 9(b). On the tooth 7,7' shown in FIG. 9(b), a depression 15 with height H and width W is formed at the center on the side that contacts with the film.

Forming a depression in this manner will allow regions with a lower stretching degree than the high-stretch regions to be formed in the moisture-permeable and waterproof film of the invention.

The depressions may have variable heights and widths depending on their location on the teeth, similar to the protrusions.

The protrusions and depressions were described above assuming a gear roll as shown in FIG. 9, but according to the invention, protrusions and/or depressions may be provided on the teeth of gear rolls, such as shown in FIG. 5 and FIG. 6, wherein the plurality of teeth are arranged on the peripheral surface perpendicular to the rotational axis line, or wherein the plurality of teeth are arranged on the peripheral surface at a fixed angle θ with respect to the rotational axis line, for example.

The method of the invention may further comprise, after the step of producing the film comprising the polylactic acid and the inorganic filler, a step of preheating the film comprising the polylactic acid and inorganic filler, at a temperature of 40° C. or higher and below the glass transition temperature of the polylactic acid (hereunder also referred to as "preheating step").

The temperature for the preheating step is preferably a temperature of about 40° C. or higher and below the glass transition temperature of the polylactic acid, and more preferably it is in the range of about 45 to about 60° C. If the preheating temperature is below about 40° C., the stretching effect in the subsequent gear stretching may be reduced or the film may tend to be torn during stretching, while if the preheating temperature is higher than the glass transition temperature of the polylactic acid, the film may be softened and cutting and other operations may be impeded.

The glass transition temperature of polylactic acid is generally known to be about 60° C., and therefore the temperature in the preheating step will generally be between about 40° C. and about 60° C.

The preheating step may be carried out by passing the film comprising the polylactic acid and inorganic filler between preheating rolls heated to a prescribed temperature. The preheating rolls may consist of a plurality of rolls.

Figure 10:
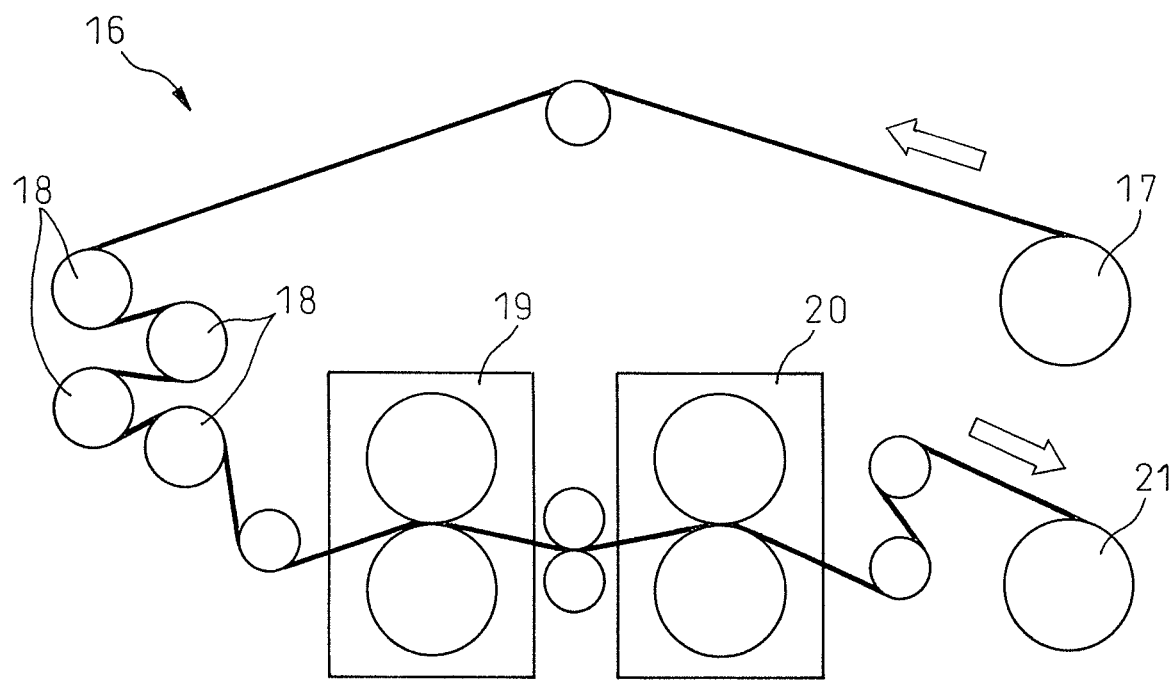
FIG. 10 shows a production system that allows production of a moisture-permeable and waterproof film of the invention.

FIG. 10 shows a production system that allows production of a moisture-permeable and waterproof film of the invention. The production system 16 shown in FIG. 10 comprises a raw film feed roll 17, a plurality of preheating rolls 18, a first gear stretcher 19, a second gear stretcher 20 and a film take-up roll 21. The second gear stretcher 20 is optional.

Since the moisture-permeable and waterproof film of the invention has excellent moisture permeability and waterproofness, it is suitable for products that require moisture permeable performance and waterproof performance, including absorbent articles, such as back films for sanitary products and disposable diapers, or wound dressing films, medical films and the like.

EXAMPLES

The invention will now be explained in greater detail using examples and comparative examples, with the understanding that the invention is in no way limited by the examples.

The devices and evaluations used in the examples and comparative examples are as follows.

[Thickness]
This was measured using a TYPE FFD-1 1.25N thickness gauge by Peacock (Ozaki Mfg. Co., Ltd.).

[Bending Resistance]
This was measured using an electric cantilever softness tester by Daiei Kagaku Seiki Mfg. Co., Ltd., under the conditions described above.

[Moisture Permeability]
This was measured under the conditions described above.

[Water Pressure Resistance]
This was measured according to JIS L 1092:2009, "Method A" (Low hydraulic pressure test).

Example 1

After combining 50 parts by mass of polylactic acid (melting point: ~160° C.) and 50 parts by mass of calcium carbonate ($CaCO_3$, mean particle size: ~5 μm) and producing pellets, an extrusion molding machine was used for molten film formation to produce a film comprising polylactic acid and calcium carbonate.

Figure 11:
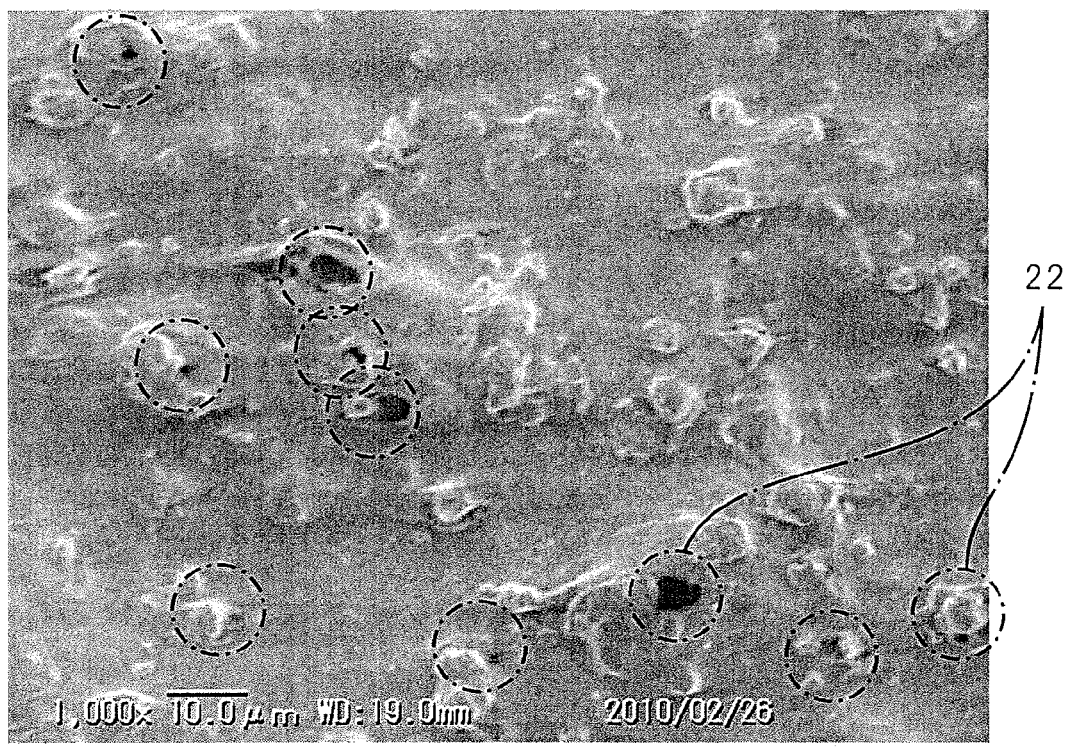
FIG. 11 is an electron micrograph of the surface of the moisture-permeable and waterproof film of the invention produced in Example 1.

A moisture-permeable and waterproof film of the invention was produced from the film comprising the polylactic acid and calcium carbonate, using a production system 16 as shown in FIG. 10. Four preheating rolls were heated to 50° C. The first gear stretcher was a gear stretcher for stretching in the machine direction (MD), such as shown in FIG. 2, and the gear pitch, gear tooth cutting depth and draw ratio were 5 mm, 4 mm and 1.35, respectively. The second gear stretcher was a gear stretcher for stretching in the cross direction (CD), such as shown in FIG. 5, and the gear pitch, gear tooth cutting depth and draw ratio were 5 mm, 3 mm and 1.45, respectively. The bending resistance and moisture permeability of the moisture-permeable and waterproof film of the invention were measured. The results are summarized in Table 1. FIG. 11 shows an electron micrograph of the surface of the moisture-permeable and waterproof film of the invention.

The water pressure resistance of the film of Example 1 was 1,020 mm.

Example 2

A moisture-permeable and waterproof film was produced and the bending resistance and moisture permeability were measured, in the same manner as Example 1, except that the gear pitch, gear tooth cutting depth and draw ratio of the first gear stretcher were 5 mm, 5.5 mm and 1.63, respectively, and the gear pitch, gear tooth cutting depth and draw ratio of the second gear stretcher were 5 mm, 5 mm and 1.70, respectively. The results are summarized in Table 1. The water pressure resistance of the film of Example 1 was 920 mm.

Example 3

The film comprising polylactic acid and calcium carbonate produced in Example 1 was passed through four preheating rolls (50° C.), and then passed through a first gear stretcher, such as shown in FIG. 2 (gear pitch: 5 mm, gear tooth cutting depth: 4 mm, draw ratio: 1.35) for gear stretching in the machine direction, and the film was temporarily taken up. Next, the film that had been gear stretched in the machine direction was passed through four preheating rolls (50° C.) and then passed through a second gear stretcher, such as shown in FIG. 2 (gear pitch: 5 mm, gear tooth cutting depth: 3.5 mm, draw ratio: 1.22) for further gear stretching in the machine direction, to produce a moisture-permeable and waterproof film, and its bending resistance and moisture permeability were measured. The results are summarized in Table 1. The water pressure resistance of the film of Example 3 was 1,000 mm.

Comparative Example 1

Figure 12:
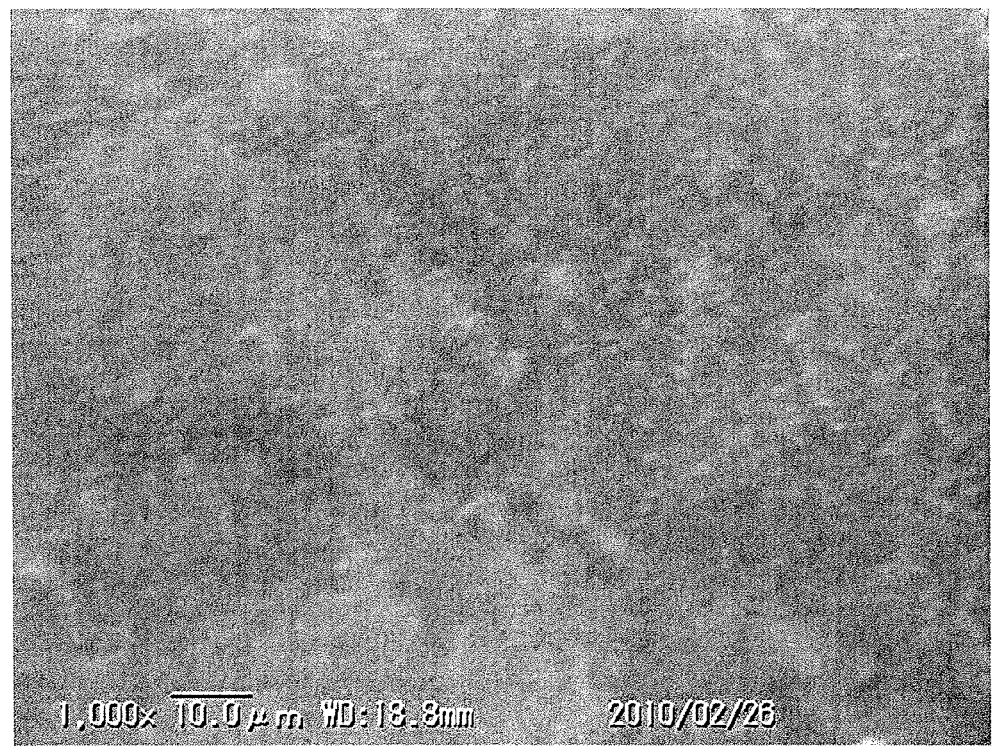
FIG. 12 is a scanning electron micrograph of the surface of the film produced in Comparative Example 1.

A polylactic acid film (Ecodeal by Toray Co., Ltd., film thickness: 20 μm) was prepared as the film for Comparative Example 1, and its bending resistance and moisture permeability were measured. The results are summarized in Table 1. FIG. 12 shows a scanning electron micrograph of the surface of the film of Comparative Example 1.

Comparative Example 2

A polylactic acid film (Ecodeal, by Toray Co., Ltd., film thickness: 20 μm) was passed through four preheating rolls heated to 50° C., stretched in the machine direction (draw ratio: 1.45) using a gear stretcher, such as shown in FIG. 2 (gear pitch: 5 mm, gear tooth cutting depth: 4.5 mm), and then stretched in the cross direction (draw ratio: 1.30) using a gear stretcher, such as shown in FIG. 5 (gear pitch: 5 mm, gear tooth cutting depth: 3 mm) to produce a film for Comparative Example 2, and its bending resistance and moisture permeability were measured. The results are summarized in Table 1.

Comparative Example 3

Figure 13:
FIG. 13 is a scanning electron micrograph of the surface of the film produced in Comparative Example 3.

The film comprising polylactic acid and calcium carbonate produced in Example 1 was prepared as a film for Comparative Example 3, and its bending resistance and moisture permeability were measured. The results are summarized in Table 1. FIG. 13 shows a scanning electron micrograph of the surface of the film of Comparative Example 3.

Comparative Example 4

Figure 14:
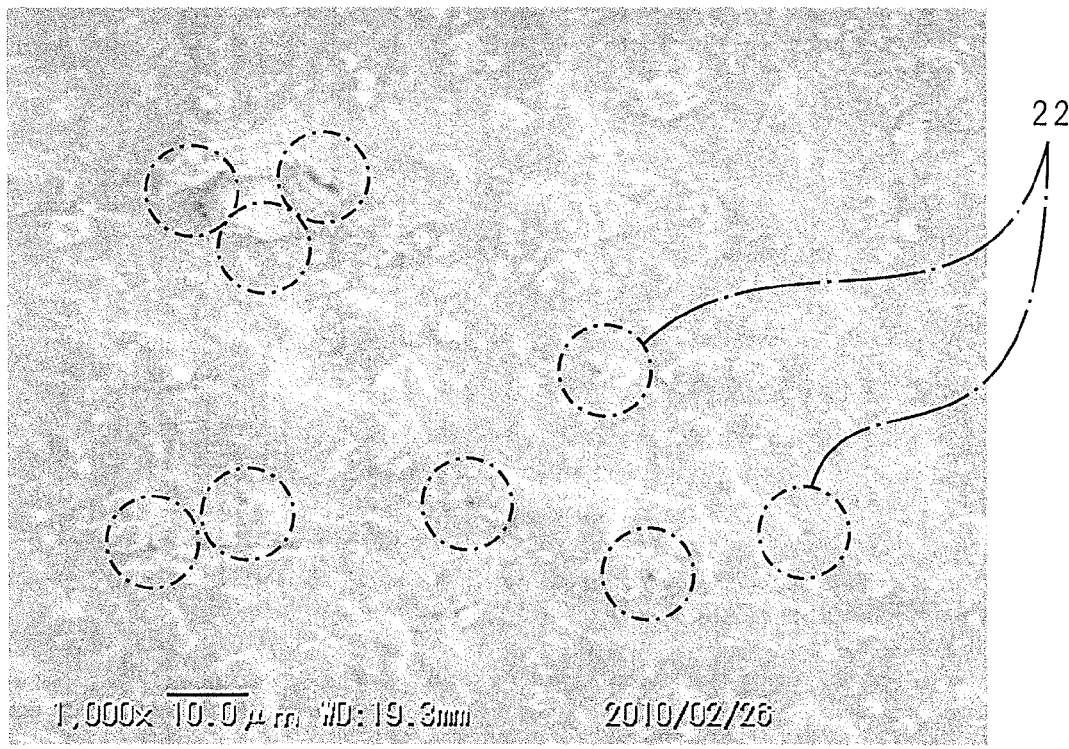
FIG. 14 is a scanning electron micrograph of the surface of the film produced in Comparative Example 4.

A uniaxially stretched back film comprising a polyethylene resin and calcium carbonate, used in commercially available disposable diapers, was used as a film for Comparative Example 4, and its bending resistance and moisture permeability were measured. The results are summarized in Table 1. FIG. 14 shows a scanning electron micrograph of the surface of the film of Comparative Example 4.

6,6' Peripheral surfaces
7,7' Teeth
8 Film comprising polylactic acid and inorganic filler
9 Film with high-stretch regions (H1) and low-stretch regions (L1)
10 Gear pitch
11 Gear tooth cutting depth
12 High-stretch region
13 Low-stretch region
14 Protrusion
15 Depression
16 Production system
17 Stock film feed roll
18 Preheating roll
19 First gear stretcher
20 Second gear stretcher
21 Film take-up roll
22 Fine hole
A Machine direction
B Cross direction
C First direction
D Second direction

The invention claimed is:

1. A method of producing a moisture-permeable and waterproof film, the method comprising the steps of:
   providing a film comprising polylactic acid and an inorganic filler, wherein the polylactic acid has a melting point of 150° C. to 170° C.; then
   preheating the film comprising the polyactic acid and inorganic filler at a temperature of 40° C. or higher and below a glass transition temperature of the polylactic acid; and

TABLE 1

|  |  | Example 1 | Example 2 | Example 3 | Comp. Ex. 1 | Comp. Ex. 2 | Comp. Ex. 3 | Comp. Ex. 4 |
|---|---|---|---|---|---|---|---|---|
| Polymer |  | Polylactic acid | Polylactic acid | Polylactic acid | Polylactic acid | Polylactic acid | Polylactic acid | Polyethylene |
| Inorganic filler |  | $CaCO_3$ | $CaCO_3$ | $CaCO_3$ | — | — | $CaCO_3$ | $CaCO_3$ |
| First gear stretching | Direction | MD | MD | MD | — | MD | — | — |
|  | Draw ratio | 135% | 163% | 135% | — | 145% | — | — |
| Second gear stretching | Direction | CD | CD | MD | — | CD | — | — |
|  | Draw ratio | 145% | 170% | 122% | — | 130% | — | — |
| Basis weight (g/m²) |  | 18 | 15 | 16 | 20 | 17 | 20 | 18 |
| Bending resistance (mm) |  | 19 | 16 | 22 | 29 | 24 | 23 | 17 |
| Water pressure resistance (mm) |  | 1020 | 920 | 1000 | — | — | — | — |
| Moisture permeability (g/m²/24 hr) |  | 2430 | 3050 | 2240 | 620 | 1370 | 790 | 2840 |

The film of Example 1 has bending resistance and moisture permeability equivalent to an existing back film for paper diapers. In addition, FIG. 11 and FIG. 14 show that the film of Example 1 has a plurality of fine holes 22, similar to an existing back film for paper diapers.

Moreover, Example 2 demonstrates that increasing the draw ratio results in higher flexibility and moisture permeability.

REFERENCE SIGNS LIST

1 Moisture-permeable and waterproof film
2,2' Projections
3,3' Recesses
4 Gear stretcher
5,5' Gear rolls stretching the film by
   passing the film, in a machine direction, through a gap between a pair of gear rolls, said pair of gear rolls having a plurality of teeth arranged around a peripheral surface of each of the pair of gear rolls, and having rotational axis lines perpendicular to the machine direction, and
   rotating the pair of gear rolls while the plurality of teeth arranged around the peripheral surface of each of the pair of gear rolls are mutually engaged, to form, in the film, high-stretch regions and low-stretch regions parallel to a first direction and alternating in a second direction perpendicular to the first direction,
wherein
said stretching further form, in the film, projections and recesses alternatingly arranged in the machine direction from the plurality of teeth, the high-stretch regions correspond to regions which undergo essentially stretching of the film and in which the film does not contact tip sections of the plurality of teeth, the low-stretch regions correspond to regions which undergo essentially no stretching of the film and in which the film contact the tip sections of the plurality of teeth, and the film has bending resistance in the range of 15-30 mm, and moisture permeability in the range of 2,000-4,000 g/m$^2$/24 hours.

2. The method according to claim 1, after the step of stretching the film to form the high-stretch regions and the low-stretch regions, further comprising a step of:

stretching the film comprising the high-stretch regions and low-stretch regions by passing said film through a gap between a pair of further gear rolls having rotational axis lines perpendicular to the machine direction, and rotating the pair of further gear rolls while a plurality of further teeth arranged around a peripheral surface of each of the pair of further gear rolls are mutually engaged, to form further high-stretch regions and further low-stretch regions in the film.

3. The method according to claim 1, wherein each of the plurality of teeth extends along the corresponding rotational axis line, and at least some of the plurality of teeth of the pair of gear rolls have variable tooth heights with protrusions and/or depressions.

4. The method according to claim 1, wherein the film is stretched at a draw ratio in the range of 1.30 to 1.80 in the step of stretching the film to form the high-stretch regions and the low-stretch regions.

5. The method according to claim 2, wherein each of the plurality of further teeth extends along the corresponding rotational axis line, and at least some of the plurality of further teeth of the pair of further gear rolls have variable tooth heights with protrusions and/or depressions.

6. The method according to claim 2, wherein the film is stretched at a draw ratio in the range of 1.30 to 1.80 in the step of stretching the film to form the further high-stretch regions and the further low-stretch regions.

* * * * *